United States Patent [19]

Cheo et al.

[11] 4,208,091
[45] Jun. 17, 1980

[54] BROADBAND MICROWAVE WAVEGUIDE MODULATOR FOR INFRARED LASERS

[75] Inventors: Peter K. Cheo; Meyer Gilden, both of West Hartford, Conn.

[73] Assignee: United Technologies Corporation, Hartford, Conn.

[21] Appl. No.: 960,509

[22] Filed: Nov. 13, 1978

Related U.S. Application Data

[63] Continuation of Ser. No. 782,866, Mar. 30, 1977, abandoned.

[51] Int. Cl.$^2$ .............................................. G02B 5/14
[52] U.S. Cl. .............................................. 350/96.13
[58] Field of Search ............... 350/96.12, 96.13, 96.14, 350/355, 356

[56] References Cited

U.S. PATENT DOCUMENTS

| | | | |
|---|---|---|---|
| 3,429,637 | 2/1969 | Wentz | 350/356 |
| 4,005,927 | 2/1977 | Caton | 350/96.14 |

OTHER PUBLICATIONS

Rigrod et al, "Wide-Band Microwave Light Modulation", Proc. of the IEEE, vol. 51, Jan. 1963, pp. 137-140.
DiDomenico et al, "Broadband Electro-Optic Traveling-Wave...", Bell Syst. Tech. Journal, vol. 42, No. 6, Nov. 1963, pp. 2621-2678.
Cheo et al, "Microwave Modulation of $CO_2$ Lasers...", Appl. Phys. Ltrs., vol. 25, No. 5, Sep. 1974, pp. 272-274.
Cheo et al, "An Integrated Optics Approach to Microwave Modulation...", IEEE Jour. Q.E., vol. QE-10, No. 9, Sep. 1974, pp. 729-730.
Cheo et al, "Microwave Waveguide Modulators for $CO_2$ Lasers", 4th Semi-Annual Tech. Report, Navy Contract N00014-73-C-0087, Sect. 4.0, Sep. 1974.
Cheo et al, "IR Waveguide Modulators...", 6th Semi-Annual Tech. Report, Navy Contract N00014-73-C-0087, Sects. 2,3,4, Sep. 1975.
Cheo et al, "High Power IR Waveguide Modulators", 7th Semi-Annual Tech. Report, Navy Contract N00014-73-C-0087, Sects. 5.0, 7.0, Mar. 1976.
Cheo, "IR Electrooptic Waveguides", Proc. of Tech. Program of E-O Syst. Design Conf., pp. 539-544, Sep. 1976.
Cheo et al., "Broadband and High Power IR Waveguide Modulators", Final Tech. Report, Navy Contract N00014-73-C-0087, Oct. 1976.

Primary Examiner—John K. Corbin
Assistant Examiner—John D. Lee
Attorney, Agent, or Firm—Dominic J. Chiantera

[57] ABSTRACT

A broadband microwave waveguide modulator uses microwave signal frequencies to provide phase modulation of an infrared laser propagating in a guided mode through a common electrooptic interaction region in the form of a microstrip transmission line, provided by electroplating microwave electrodes on each of two mutually opposed major surfaces of a monolithic, thin-film optical waveguide having uniform thickness, to provide a high efficiency conversion of a portion of the laser carrier power into optical sideband signals.

6 Claims, 8 Drawing Figures

BROADBAND MICROWAVE WAVEGUIDE MODULATOR FOR INFRARED LASERS

The Government has rights in this invention pursuant to Contract No. N00014-73-C-0087 awarded by the Office of Naval Research, U.S. Department of the Navy.

CROSS-REFERENCE TO RELATED APPLICATION

This is a continuation of application Ser. No. 782,866 filed on Mar. 30, 1977, now abandoned.

The subject matter hereof is also disclosed, and some of it is claimed, in a commonly owned copending U.S. patent application entitled MONOLITHIC, THREE-DIMENSIONAL INFRARED WAVEGUIDE FOR HIGH POWER LASERS, Ser. No. 782,857 filed on Mar. 30, 1977 by P. K. Cheo, now U.S. Pat. No. 4,124,270, Nov. 7, 1978.

BACKGROUND OF THE INVENTION

1. Field of Invention

This invention relates to laser modulators, and more particularly to broadband microwave waveguide modulators for infrared (IR) lasers.

2. Description of the Prior Art

The use of a combination bulk electrooptic crystal and a microwave waveguide to provide electrooptic modulation of an infrared (IR) laser is known in the art. The electrooptic crystal functions as an optical waveguide and the modulation of the IR beam is produced by a modulation signal subcarrier at microwave frequencies which modulate the index of refraction of the optical waveguide medium through a nonlinear electrooptic effect in the waveguide that results in a phase shift modulation of the IR beam. The phase shift modulation creates a power conversion of a portion of the IR carrier signal into optical sideband signals. The modulated IR beam ($f_o$) is comprised primarily of the input IR carrier frequency ($f_c$) and the first order upper and lower sideband frequencies produced by the modulation signal ($f_m$), i.e. $f_o = f_c \pm f_m$, each occurring within a modulation bandwidth (B) defined as the frequency range of the optical sideband signals between the $-3$ db, or half power points. Due to the thickness of the bulk crystal, the conventional bulk electrooptic crystal modulator requires extremely high modulation input power levels to provide the required electric field intensity within the crystal resulting in a low conversion efficiency, i.e. the ratio of laser side band power to the modulation signal driving power Subsequent development of planar waveguide modulators using thin-film electrooptic crystals provided for improved conversion efficiency of the modulator. With decreasing film thickness, the modulation signal input power in the thin-film waveguide modulators can be reduced in proportion to the thickness while still maintaining the same modulation power density. The typical driving power required to obtain the required modulation field intensity in the thin-film crystal waveguide is on the order of one hundred times less than the driving power required in the bulk crystal devices. In addition, the thin-film waveguide alleviates the problem of beam diffraction and alignment encountered with bulk crystal waveguides so that the length of the interaction region (that portion of the optical propagation path in the optical waveguide which is common with that occupied by the electric field intensity produced in the waveguide by the modulation signal) can be significantly increased.

A standing wave, or resonant microwave modulator incorporating a thin-film electrooptic waveguide in a microwave modulator structure was first reported in an article entitled Microwave Modulation of $CO_2$ Lasers and *GaAs Optical Waveguides*, by P. K. Cheo and M. Gilden, Applied Physics Letters, Volume 25 No. 5, Sept. 1, 1974, Pages 272–274. There the generation of a $CO_2$ laser sideband power at frequencies $\pm 10$ GHz from the laser carrier frequency was provided through use of a minigap microwave ridge waveguide modulator loaded with a thin-film Gallium Arsenide (GaAs) slab between the minigap ridge and a base plate. The microwave ridge modulator increased the power conversion efficiency by a factor of 300 over that obtained with a bulk crystal modulator and the length and width of the interaction region was on the order of 1 cm and 25 microns respectively, which allowed a high microwave field intensity to be sustained at either X band or Ku band within the entire interaction region. Similarly, a traveling wave modulator structure using a thin-film electrooptic waveguide in a traveling wave minigap microwave ridge structure was reported in an article *Thin Film Waveguide Devices*, by P. K. Cheo, Applied Physics, Vol. 6, pages 1–19 (1975). The distinguishing performance characteristics between the resonant standing wave modulator and the traveling modulator, centers on the power conversion efficiency and modulation bandwidth. The standing wave structure provides higher power conversion efficiency, while the traveling wave device provides a larger modulation bandwidth.

The disadvantages on both standing wave and traveling wave microwave ridge modulators is the inability to provide a high degree of electrode to waveguide surface contact, which results from surface imperfections in the waveguide material. The lack of intimate electrical contact between the electrode surface of the ridge and the surface of the waveguide creates air gaps between the surfaces which result in impedance mismatch between the output impedance of the microwave source and the effective input impedance of the microwave ridge waveguide. In addition to the impedance mismatch, the airgap causes an increase in the velocity of propagation of the microwave signal in the interaction region since the airgap and the waveguide create a composite medium with an index of refraction less than that of the waveguide itself. This results in nonsynchronization of the modulating signal with the optical wave and a direct degradation in modulator performance.

The problems of large physical size and inefficiency present in the mini-gap waveguide modulator are eliminated in an integrated modulator structure in which the microwave electrodes are electroplated directly on the top and bottom surfaces of the thin-film optical waveguide. Such integrated structures have been developed using thin-film planar optical waveguides, and provide a far greater conversion efficiency than that of the bulk crystal devices or the mini-gap waveguide modulator structure. These planar waveguide devices, however, suffer from degradation in the optical coupling efficiency and the inability to provide exact confinement of the optical wave through the modulation field. This results in optical distortion in the modulated wave and less than the fully realizable conversion efficiency levels.

SUMMARY OF THE INVENTION

The object of the present invention is to provide a high efficiency broadband microwave waveguide modulator for phase modulating infrared laser signals provided by a laser source to a guided laser propagation path in the modulator, in response to microwave modulation signals presented from a microwave signal source.

According to the present invention a broadband microwave waveguide modulator includes a nonplanar thin-film optical waveguide comprised of a monolithic structure of electrooptic material, the structure having first and second parallel sides of equal length and width, the first side including a raised ridge having an upper surface length and width smaller than that of the first side, the raised ridge confining the laser propagation to a guided laser propagation path defined by that portion of the waveguide structure between the ridge upper surface and the second side, the modulator including an optical coupler disposed at each end of the raised ridge for coupling the laser signals through the guided laser propagation path in a selected TE propagation mode, the modulator further including a pair of microwave electrodes, one disposed on the first side co-extensive with the raised ridge and the second electrode disposed on the second side co-extensive with that portion bounding the guided laser propagation path, the electrodes each responsive to the modulation signals from the microwave signal source for providing a microwave modulated electric field in the guided laser propagation path for phase modulating the laser signal propagating therein.

In further accord with the present invention, the waveguide structure first and second parallel sides include a multi-level first side and planar second side, the first side having a major surface and a minor surface each parallel to the second side, and each displaced from the second side by a minimum dimension and a maximum dimension respectively, the raised ridge projecting above the major surface and extending longitudinally along a central portion of the first side, the minor surface being coplanar with the upper surface of the raised ridge, each of the optical couplers being disposed on the minor surface of said first side to provide coupling of the laser signal through the guided propagation path in a $TE_1$ propagation mode. In still further accord with the present invention, the minor surface is co-extensive with the upper surface of the raised ridge and the optical couplers are each disposed on the major surface, the waveguide structure further including a taper at each end of the raised ridge, each taper extending from the minor surface to the major surface and each having a width equal to that of the raised ridge, the tapers providing a continuous transition in the waveguide material between the minor surface and the major surface, the optical couplers in combination with the tapers providing coupling of the laser signal through the guided propagation path in a $TE_0$ propagation mode.

Other objects, features and advantages of the present invention will become more apparent in the light of the following detailed description of the preferred embodiment thereof, as illustrated in the accompanying drawing.

DETAILED DESCRIPTION

In the broadband microwave waveguide modulator of the present invention, high power conversion efficiencies are achieved by providing exact alignment of the laser signal propagating through the modulator with the microwave modulation electrical field. As described in detail hereinafter, this exact alignment of the laser signal is achieved by a raised ridge waveguide structure included in the modulator. This permits exact placement of the modulator microwave elements in direct alignment with the laser propagation path ensuring full modulation field intensity throughout the total laser propagation path. A broadband modulator having a thin-film planar waveguide will first be described to first demonstrate the problems associated with non-alignment of the microwave and laser signal in a broadband modulator.

Figure 1:
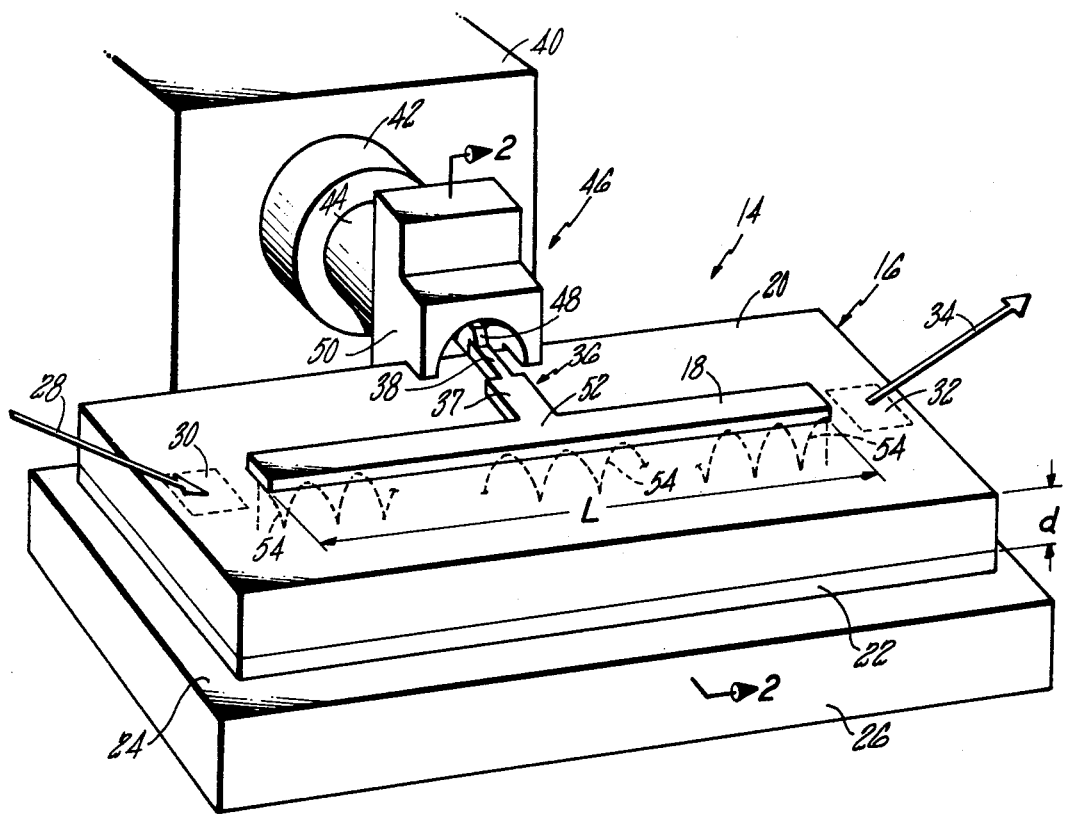
FIG. 1 is a perspective illustration of one embodiment of a standing wave broadband microwave waveguide modulator according to the present invention.
Figure 5:
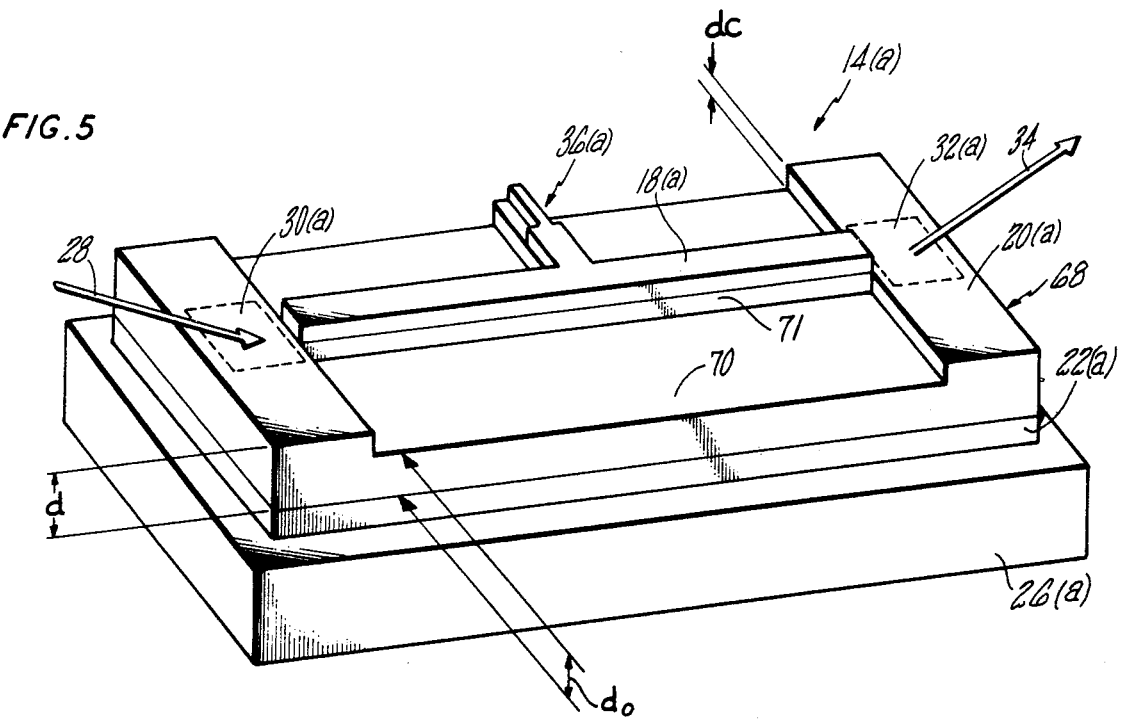
FIG. 5 is a perspective illustration of another embodiment of a standing wave broadband microwave waveguide modulator according to the present invention.
Figure 6:
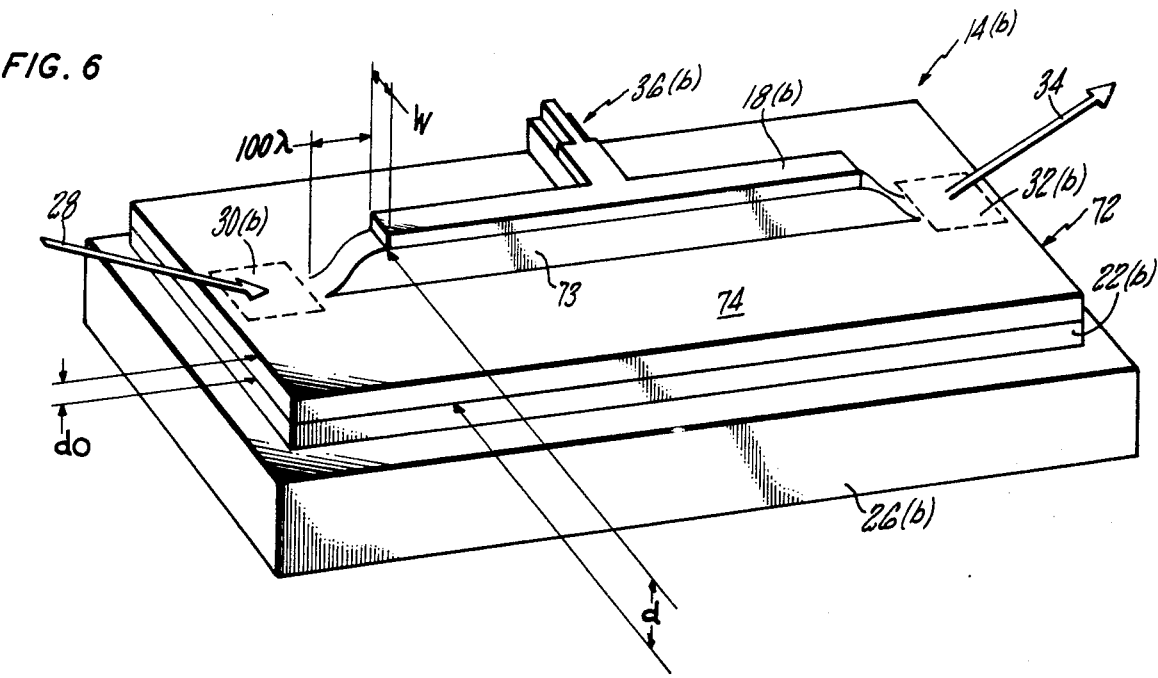
FIG. 6 is a perspective illustration of still another embodiment of a standing wave broadband microwave waveguide modulator according to the present invention.

Referring first to FIG. 1, in a broadband microwave waveguide modulator including a planar thin-film waveguide 16, the waveguide comprises a monolithic structure of electrooptic material, such as Gallium Arsenide (GaAs), Cadmium Teluride (CdTe), Zinc Selenide (ZnSe). The waveguide dimensions, including the length ($L_0$), width ($W_0$) and thickness (maximum dimension, d), are generally selected on the basis of the type of infrared (IR) laser to be phase modulated. Since a widely used IR laser is the $CO_2$ laser having narrow laser line widths in the nine to eleven micron wavelength region which are suitable for use in applied optical systems, the modulator of FIG. 1, and the raised ridge modulators of FIGS. 5, 6 are described dimensionally in terms of a broadband modulator for a 10.6 micron wavelength $CO_2$ laser. This is provided only for illustrative purposes and in no way limits the range of IR lasers which may be phase modulated, which in the present modulator structures extend from the near infrared to the far infrared spectral range. The differences in laser frequency result only in dimensional value changes in the structure.

The maximum dimension (d) of the thin-film waveguide 16 is in the range of two to three wavelengths of the infrared laser signal (between 20 and 30 microns)

and is typically on the order of 25 microns. The width ($W_0$) and length ($L_0$) are on the order of one millimeter and five centimeters respectively. A microstrip electrode 18 is disposed on the upper surface 20 of the waveguide 16, and a microwave ground electrode 22 is disposed on the bottom major surface of the waveguide. The electrodes are preferably copper with an electrode thickness on the order of 10 microns and are disposed on the surfaces through a known electroplating process. The waveguide structure with electrodes is bonded to an optically polished surface 24 of a metallic base 26, through a two micron layer of low viscosity resin, such as Stycast 1217 resin manufactured by Emerson and Cuming Inc. The base 26 provides both heat dissipation of the combined optical and microwave modulation signal power within the waveguide 16 and also structural strength to the thin-film waveguide to prevent fracture or distortion.

The modulator 14 includes optical couplers, which may be of any one of a number of types known in the art, such as right angle prisms or gratings. The right angle prism couplers are generally preferred over the grating couplers for the broadband microwave waveguide modulator due to their higher coupling efficiency. Generally the right angle prisms are germanium (Ge) prisms of a type known in the art with the prism geometry selected such that the IR laser signal 28 is excited in the lower order $TE_0$ or $T_{E1}$ propagation modes within the waveguide 16. The prism couplers are not illustrated in FIG. 1 since they are much larger than the waveguide 16 and would obscure the illustration of the modulator structure. The location of the couplers on the surface 20 is illustrated by the dashed line optical coupling regions 30, 32. The input laser signal 28 from the laser source is coupled into the waveguide at the coupling region 30 and propagates through the guided propagation path and the common interaction region provided along the guided laser path by the electrode 18. As described in detail hereinafter, the modulator 14 provides at the coupling region 32 an output laser signal 34 at a frequency $f_o = f_c \pm f_m$, where $f_m$ is the microwave modulation signal frequency.

For the standing wave modulator structure 14 of FIG. 1, the microstrip electrode 18 has a single port connection to the microwave modulating signal source which is provided through a single step impedance matching transformer section 36, comprised of secondary and primary electrode portions 37, 38 connected in series for a total transformer section length on the order of one-quarter wavelength of the modulation signal. Each electrode portion has a characteristic impedance determined by the width, thickness and length of the corresponding section. A microwave signal source 40 of a type known in the art, such as a traveling wave tube (TWT) power amplifier, provides a microwave modulation signal through an output connector 42 to a coaxial line 44, the output end of which is connected to a microwave launcher 46 having an extended center conductor 48 electrically connected to the center conductor of the coaxial line 44, and a semicircular shield 50 electrically common with the outer shield of the line 44. A microwave circulator of a type known in the art may be interconnected between the microwave signal source 40 and the coaxial line 44 to prevent inadvertent overloading and damage to the source.

Figure 2:
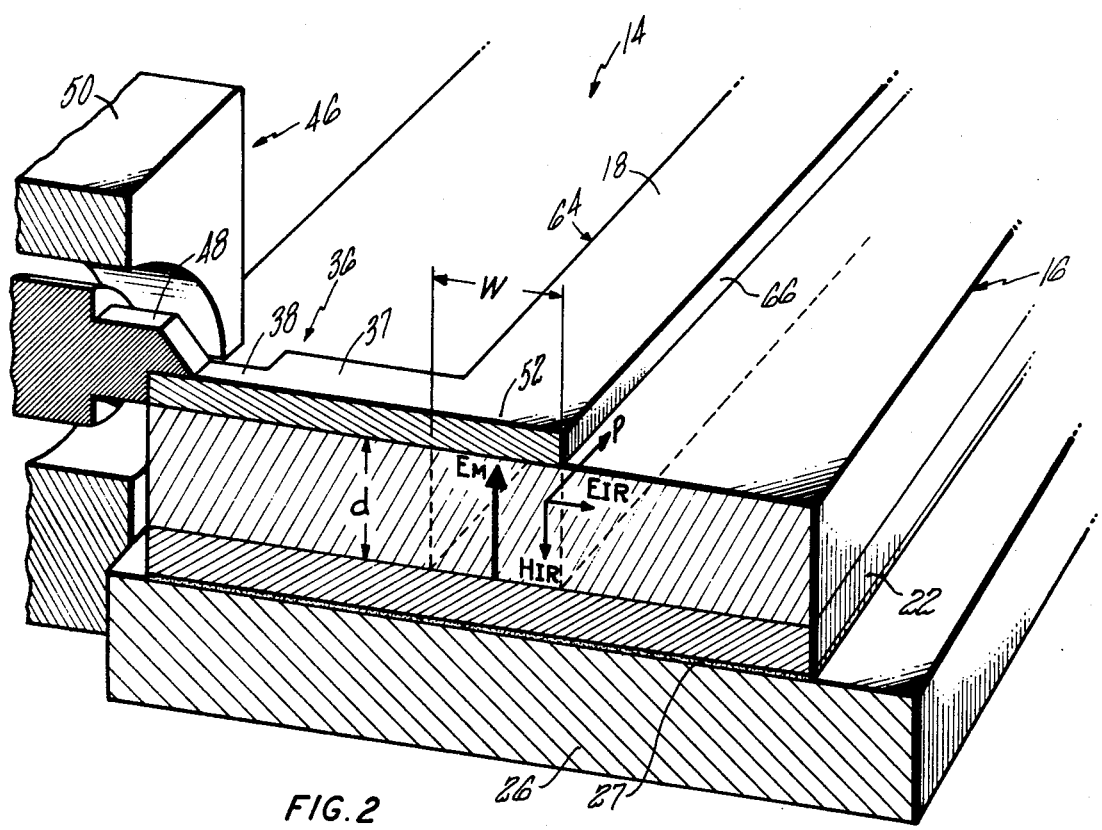
FIG. 2 is a cut-away, perspective illustration of a portion of the waveguide modulator of FIG. 1.

The center conductor 48 is of a standard 50 ohm construction as illustrated in more detail in FIG. 2. The center conductor 48 is in electrical contact with the electrode portion 38 of the impedance matching transformer 36 which provides impedance matching between the characteristic impedance of the conductor 48 and the input impedance of the microstrip electrode 18. The widths of the electrode portion 37, 38 provide a typical 4:1 reduction in impedance between the conductor 48 and microstrip electrode 18. As a result, output impedance of the source 40, which is typically 50 ohms, is reduced to approximately 12 ohms at a center feed point 52 which is equal to the input impedance of the electrode 18.

The center fed microwave excitation of the microstrip electrode excites a standing wave along the length L of the electrode. The signal components of the standing wave that are synchronous with the guided laser beam within the interaction region modulate the laser beam. If the signal source is well matched to the input impedance of the microstrip, the amplitude of the synchronous signal components of the standing wave produced by the modulation signal is independent of frequency. The two halves of the electrode 18 on either side of the center feed point 52 have a length L/2 which is equal to an integral number of quarter wavelengths of the modulation frequency, and each end of the microstrip electrode is terminated in an open circuit. As a result, the termination at the center feed point 52 is an open circuit and the effective impedance of the electrode 18 at the center point 52 is at a maximum for the modulation frequency. The distribution of the standing wave along the length L of the electrode 18 is shown generally by the phantom waveform 54.

The width of the microstrip electrode 18 is limited primarily by microwave loss considerations, with a too wide electrode resulting in a reduction of conversion efficiency and modulation bandwidth. For a fixed width W, the overall length L of the microstrip is governed by optical considerations. While a long interaction region is preferred, it is known that a diffraction limited laser beam can only be collimated within a microstrip electrode having a width-to-length radio (W/L) defined by:

$$\frac{W^2}{L} \cong 9 \left( \frac{4\lambda}{N\pi} \right),$$

where $\lambda$ and N are, respectively, the laser wavelength and refractive index of the waveguide. For the modulator 14 having a thin-film waveguide 16 of Cr-doped GaAs which has a resistivity greater than $10^8$ ohms per centimeter, the refraction index N=3.275 at the 10.6 $\mu M$ wavelength $CO_2$ laser. Therefore, if the microstrip electrode 18 width W=1 mm, the length L of the electrode, and the interaction region, cannot exceed 3 cm.

Referring now to FIG. 2, in a cutaway perspective view of the modulator 14, the microwave signal presented between the center conductor 48 and shield 50 of the launcher provides a modulation electric field intensity, as shown by the vector $E_m$, within a cross section of the interaction region bounded by the width W of the microstrip electrode 18, the maximum dimension (d), and the ground electrode 22. The laser beam propagates in the direction of the Poynting vector $\vec{P}$, as defined by the electric ($E_{IR}$) and magnetic ($H_{IR}$) field intensities of the laser.

Within the interaction region a portion of the laser carrier power is converted into first order laser sideband frequencies. These sideband frequencies are up and down shifted from the laser carrier frequency $f_c$ by the microwave modulation frequency $f_m$, which provides phase modulation of the laser carrier through a change in refractive index $\Delta N$ of the waveguide 16. The change of refractive index for a TE mode laser propagating along either the (011) or (01̄1) axis under the modulation electric field $E_M$ applied along the (100) axis is defined by: $\Delta N = (\frac{1}{2})N^3 \cdot r_{41} \, E_M$, where $r_{41} = 1.2 \times 10^{-10}$ cm per volt, and $E_M$ is the modulation electric field intensity. Since $\Delta N$ is directly proportional to $E_M$, the thin-film waveguide provides a considerably higher $\Delta N$ value than that provided by the bulk crystal devices by providing a higher density electric field intensity within the narrow thickness d of the thin film. As known, the phase modulated laser carrier field (E) may be expressed in a power expansion of Bessels function as: $E = E_0[(J_0(\Delta\phi) \sin(\omega_0 t + \phi_0) + J_1(\Delta\phi) \cos(\omega_0 t \pm \omega_\mu t + \phi_0) + \ldots]$ where $E_0$, $\omega_0$, and $\phi_0$ are the amplitude, angular frequency, and phase of the laser carrier, and $\omega_\mu$ and $\Delta\phi$ are the microwave angular frequency, and the laser carrier phase shift caused by the electrooptic interaction of the microwave field and the laser beam in the interaction region. The amplitude of the first order sidebands can be expressed by the approximation: $J_1(\Delta\phi) \approx \Delta\phi/2$. The laser carrier phase shift, $\Delta\phi$ is directly proportional to the change of refractive index $\Delta N$ of the waveguide, as defined by: $\Delta\phi = (2\pi/\lambda)L \, \Delta N$, where L is the interaction region length, and $\lambda$ is the laser wavelength. Therefore, by providing a higher $\Delta N$ value the thin-film waveguide structure 16 provides an increased laser phase shift over that obtainable in the bulk crystal modulators for the same magnitude of input microwave modulation power, resulting in an increased power conversion efficiency. Under matched impedance condition between the microwave source 40 and microstrip electrode 18, the power in the first order sideband ($P_{SB}$) is given by the expression: $P_{SB} = (\Delta\phi/2)^2 P_C$, where $P_C$ is the laser carrier power. With the optical and the microwave fields in synchronism, the exact phase shift $\Delta\phi$ is given by the expression:

$$\Delta\phi = \frac{\pi}{2\lambda} \cdot r_{41} \cdot N^3 \left(\frac{2P_M \zeta L}{dW\alpha}\right)^{\frac{1}{2}}$$

where $P_M$ is the available microwave power, W is the width of the microstrip electrode 18, $$\zeta = 1/N \sqrt{\mu_0/\epsilon_0} = 377/3.5,$$

$\alpha$ is the microwave attenuation in nepers per unit length, and d is the thickness of the waveguide.

Figure 3:
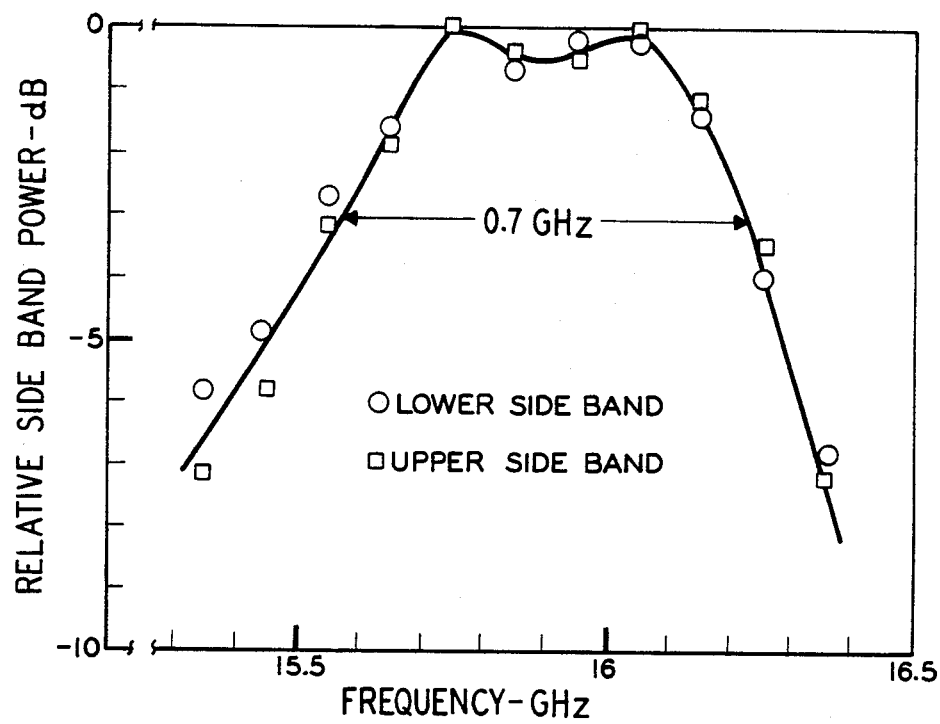
FIG. 3 is an illustration of the modulation frequency bandwidth of the optical sideband signals provided by the waveguide modulator of FIG. 1.

Due to the length of the microstrip electrode 18 there exists a series of resonant frequencies along the line. For the $CO_2$ laser standing wave modulator having a length L equal to 2.8 cm (the length 2.8 cm equals approximately 5 wavelengths of the microwave frequency at 15 GHz) and a center feed input impedance transformer 36 designed for a modulation frequency of 15 GHz, laser sideband power may be provided at each of the resonant frequencies of 9.9 GHz, 12.3 GHz, 15.0 GHz and 17.8 GHz. The relative sideband power in decibels (dB) as a function of microwave frequency is shown in FIG. 3, where the measured modulation bandwidth, i.e. the range of frequency between the $-3$ dB points, and conversion efficiency are nominally 700 Mhz and 0.7% respectively for an interaction length of 2.8 cm and an input microwave power of 20 watts.

Figure 4:
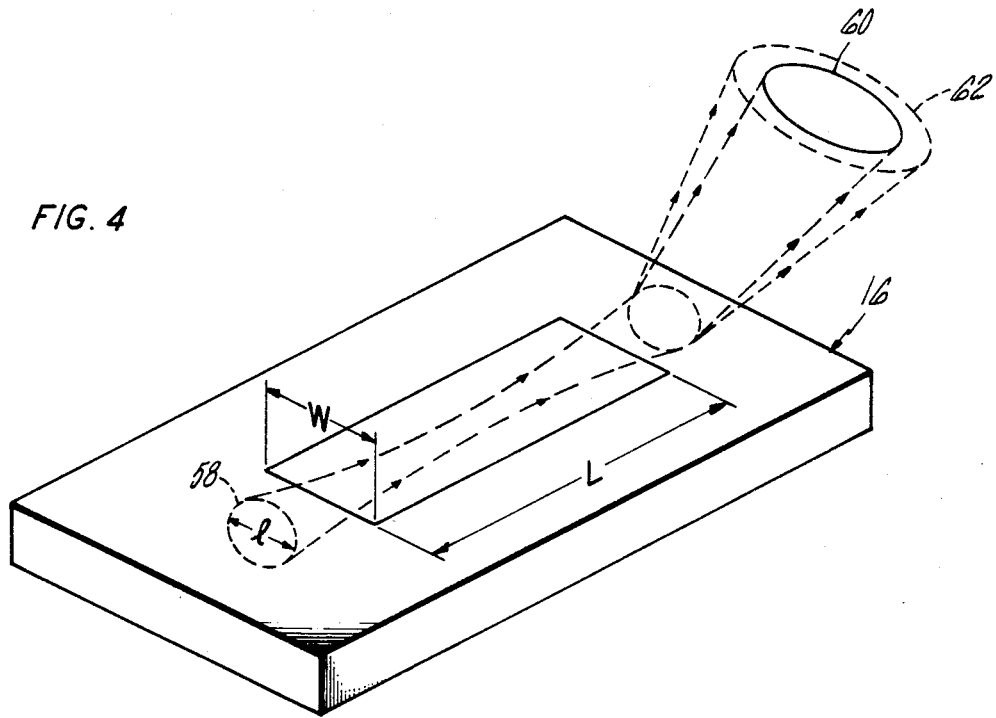
FIG. 4 is an illustration of an operating characteristic of the waveguide modulator of FIG. 1.

While the modulator 14 requires the use of a narrow microstrip electrode to provide the desired sideband power conversion efficiency and modulation bandwidth, the narrow microstrip electrode causes difficulty in alignment of the coupled-in laser beam with respect to the interaction region. A slight misalignment of the laser with respect to the interaction region causes spreading and deflecting of the beam in the plane of the waveguide, and produces significant distortion of the output laser beam shape. Referring to FIG. 4, in the absence of the microstrip electrode an input gaussian shaped laser beam 58 having a beam diameter l, approximately equal to the width W of the electrode 18 (FIG. 1), propagates through a portion of the planar waveguide 16 having a width W and length L equal to that of the microstrip electrode and is coupled out with a beam shape 60 nearly identical to that of the input beam. The transverse beam wave shape is essentially confocal through the length of the waveguide, as shown. In the presence of the microstrip electrode 18 the output beam is severely distorted from that of the input beam as shown by the phantom waveform 62, without a change in the out-coupled angle of the beam. The distortion is substantially elliptical and becomes nonsymmetrical if the beam is misaligned with respect to the interaction region beneath the electrode. This lens-like effect is caused by surface deformation of the waveguide along the edges 64, 66 (FIG. 2) of the electrode 18, which produces a localized stress induced birefringence that is typically one order of magnitude larger than the microwave field induced birefringence. The elliptical distortion further increases with applied microwave power as a result of thermal induced birefringence. The lens-like effect can be eliminated by increasing the electrode width to a value approximately twice that of the input beam diameter. As stated hereinbefore, the increase in electrode width is not desirable because such an increase in the electrode area causes an increase in the device capacitance per unit length, resulting in a reduction in the modulation bandwidth, electric field power density, and power conversion efficiency. A preferred approach for eliminating the beam distortion is to remove the waveguide material which borders the edges (64, 66 FIG. 2) of the microstrip electrode to a determined depth ($d_c$), to provide a modulator with a ridge waveguide structure. The removal of the waveguide material eliminates the stress induced birefringence and provides a guiding of the laser such that nearly perfect alignment of the laser beam and the microwave field ($E_M$) is achieved within the desired narrower width W and over the propagation length L of the interaction region. Furthermore, the guiding of the beam provided by the ridge structure forces the collimation of the beam in the interaction region, eliminating the confocal limitation on length described hereinbefore, and allowing the interaction length to be dependent primarily on the loss characteristics of the waveguide material. With the ridge waveguide modulator structure, the output coupled laser beam shape is not degraded from that of the incident beam shape.

Referring now to FIG. 5, in one embodiment of a broadband microwave waveguide modulator according to the present invention a modulator 14(a), similar to the modulator 14 of FIG. 1, includes a raised ridge thin-film waveguide 68. A microstrip electrode 18(a) and a ground electrode 22(a), identical to those described hereinbefore with respect to FIG. 1, are electroplated on the top and bottom major surfaces of the waveguide 68, and the combination waveguide 68 and electrodes 18(a), 22(a) are similarly bonded to a metallic base 26(a). As before, the laser beam 28 is coupled in and out of the channel waveguide 68 through right angle germanium couplers (not shown), located within the optical coupling regions 30(a), 32(a) on the surface of the waveguide. The removal of the waveguide material along the edges of the electrode 18(a) provides the waveguide with a multi-level top side including a minor surface 20(a) projecting at a height ($d_c$) above a major surface 70. The minor surface is coplanar with the upper surface of the raised ridge 71 on which the electrode 18(a) is disposed. The minor and major surfaces are each parallel to the bottom major surface of the waveguide and are displaced at the maximum dimension d and a minimum dimension $d_o$ respectively. The minimum dimension is equal to the difference between the maximum dimension d and the height $d_c$. The width and length of the electrode 18(a) is co-extensive with that of the raised ridge 71, each at a value determined by the width-to-length ratio ($W^2/L$) described hereinbefore. The topography of the ridge, i.e. the length, width and projection above the major surface, in combination with the maximum dimension d of the waveguide structure between the minor surface 20(a) and the bottom major surface, defines the guided laser propagation path within the waveguide. The placement of the electrode 18(a) on the upper surface of the raised ridge and co-extensive therewith provides for exact alignment of the microwave modulated electric field with the guided laser propagation path resulting in a precise interaction region. In addition, the fact that the electrode 18(a) is co-extensive with the ridge structure, each of equal dimensions, compensates for the difference in refractive index of the surface portion of the waveguide along the edges of the electrode, thereby eliminating the stress induced birefringence effect which causes distortion of the beam.

The maximum dimension d is again in the range of two to three times the wavelength of the laser signal presented from the laser source. For the $CO_2$ laser the maximum dimension is on the order of 25 microns. The minimum height $d_c$ required to provide sufficient definition of the ridge structure and confinement of the laser beam within the width W and length L of the interaction region, is on the order of 5 microns. This results in a minimum dimension on the order of 20 microns between the major surface 70 and the bottom major surface of the waveguide.

As described in the cross-referenced copending application, a waveguide thickness of 25 microns in the coupling regions provides a much higher coupling efficiency of the layer in the waveguide for the $TE_1$ propagation mode than the lower order $TE_0$. The $TE_1$ mode efficiency is higher by a factor of two. However, the higher order $TE_1$ is also a higher loss guided wave mode, resulting in lower conversion efficiency and sideband power due to increased microwave losses within the modulator structure. For a thickness of 25 microns in the interaction region, the power loss due to the absorption of the electrode 18(a) having a length L equal to 2.8 cm, is only about 13% for the $TE_0$ mode as compared to the much higher power loss of the $TE_1$ mode, and it is more desirable to excite the lower order $TE_0$ mode within the waveguide interaction region. Efficient excitation of the $TE_0$ mode requires a waveguide thickness in the coupling regions which is on the order of 12 to 15 microns. Therefore, an optimum standing wave, broadband modulator includes a thin-film waveguide structure with an interaction region thickness of 25 $\mu M$, a channel thickness along the length of the interaction region having a depth of at least 5 $\mu M$, and a thickness in the prism base optical coupling regions on the order of 12 to 15 microns. Such a waveguide structure as embodied in a standing wave modulator is illustrated in FIG. 6.

Referring now to FIG. 6, in a second broadband waveguide modulator according to the present invention, a modulator structure 14(b) includes a waveguide 72 having a raised ridge portion 73 formed in the multi-level top side of the waveguide. In the waveguide 72 the minor surface is co-extensive with the upper surface of the raised ridge 73 and the major surface 74 comprises the remaining surface area of the top side. The minor surface is displaced from the bottom major surface of the waveguide by the maximum dimension d whose value is in the range of two to three times the wavelength of the laser signal. Typically 25 microns for the $CO_2$ laser. The major surface 74 is displaced from the bottom surface of the waveguide by the minimum dimension $d_o$ which is at least 5 microns smaller than the maximum dimension, i.e. 5 microns being the minimum value of the height dimension $d_c$ required to provide confinement of the laser signal to a propagation path defined by the topography of the raised ridge. A microstrip electrode 18(b), identical to those of the modulators 14, 14(a) of FIGS. 1, 5 is disposed on the upper surface of the ridge 73, co-extensive with the length and width of the upper surface. Each end of the ridge is provided with a smooth, piecewise linear taper which extends from the upper surface of the ridge to the major surface 74. The taper has a width W equal to that of the ridge 73 and provides a continuous transition in the waveguide material between the upper surface of the ridge and the major surface 74. The taper length, measured as the projection of the taper on the major surface 74, is on the order of one hundred wavelengths (100 $\lambda$) of the optical frequency.

As with the modulator structures 14, 14(a), the laser signal 28 is coupled in and out of the waveguide 72 through the use of known optical couplers, such as the right angle prism couplers. The couplers are disposed on the major surface 74 at each end of the raised ridge 73, and are located within the coupling regions 30(a), 32(a). With the couplers disposed on the major surface 74 which is displaced from the bottom side of the waveguide by the minimum dimension ($d_c$), the geometry of the optical couplers (angle of incidence for the right angle prism coupler) is selected to ensure the efficient excitation of the low order $TE_0$ propagation mode for the laser signal coupled into the guided laser propagation path within the raised ridge 73.

The microstrip electrode 18(b) receives the microwave modulation signals through a center feed quarter wavelength section having a matching transformer section 36(b) identical to that described hereinbefore with respect to the microstrip electrode 18. The second microwave electrode (ground electrode) 22(b) is disposed on the bottom surface of the waveguide, the electrode dimensions being at least co-extensive with the portion of the bottom surface which bounds the guided laser propagation path. In FIG. 6 the electrode 22(b) is electroplated across the entire lower surface. As in the previous modulator structures, the waveguide 72 including the microwave electrodes and optical couplers disposed thereon is bonded to a metallic base structure 26(b).

The modulator 14(b) provides a significant number of advantages over the modulators 14, and 14(a) including: (1) improved coupling efficiency for the $TE_0$ mode for small laser beam diameters, thereby reducing the optical wave propagation loss in the interaction region, (2) an increase in the electric field density of the microwave modulating signal as a result of the raised ridge structure which confines the modulation field to the width W of the microstrip electrode 18(b), (3) elimination of the beam distortion caused by the stress induced birefringence of the waveguide surface portion along the edges of the microstrip electrode, and (4) excellent alignment of the laser beam within the interaction region. The overall efficiency of the modulator is equal to the product of the optical efficiency and the microwave efficiency. The use of the thinner dimension waveguide in the optical coupling region combined with the piece-wise linear taper of the raised ridge waveguide which permits the efficient excitation of the low order $TE_0$ modes within the waveguide, provides an improvement in optical efficiency on the order of two to three times that of the waveguide structures in FIGS. 1, 5 such that the overall efficiency of the modulator 14(b) of FIG. 6 is similarly improved by a factor of two to three times that of the prior modulator.

The modulators of FIGS. 1, 5, 6 all represent different embodiments of broadband modulator for infrared lasers which are of the resonant, or standing wave type modulator. The choise of standing wave modulator structure is governed by the required performance criteria and considerations of cost, since the line of structures from planar to raised ridge become increasingly more complex to fabricate. The center fed microstrip electrode configuration with the single step impedance matching transformer, causes the resonant type modulator structures to provide a relatively high power conversion efficiency at a narrow modulation bandwidth. An alternative embodiment of the broadband, microwave waveguide modulator according to the present invention, is that of a traveling wave modulator structure in which the microwave modulation signal propagates through the interaction region of the modulator from an input port to an output port, at a wave velocity synchronous with that of an optical wave propagating simultaneously through the interaction region. The traveling wave structure provides a broader modulation bandwidth than that of the resonant type structure, but with a lower conversion efficiency.

Figure 7:
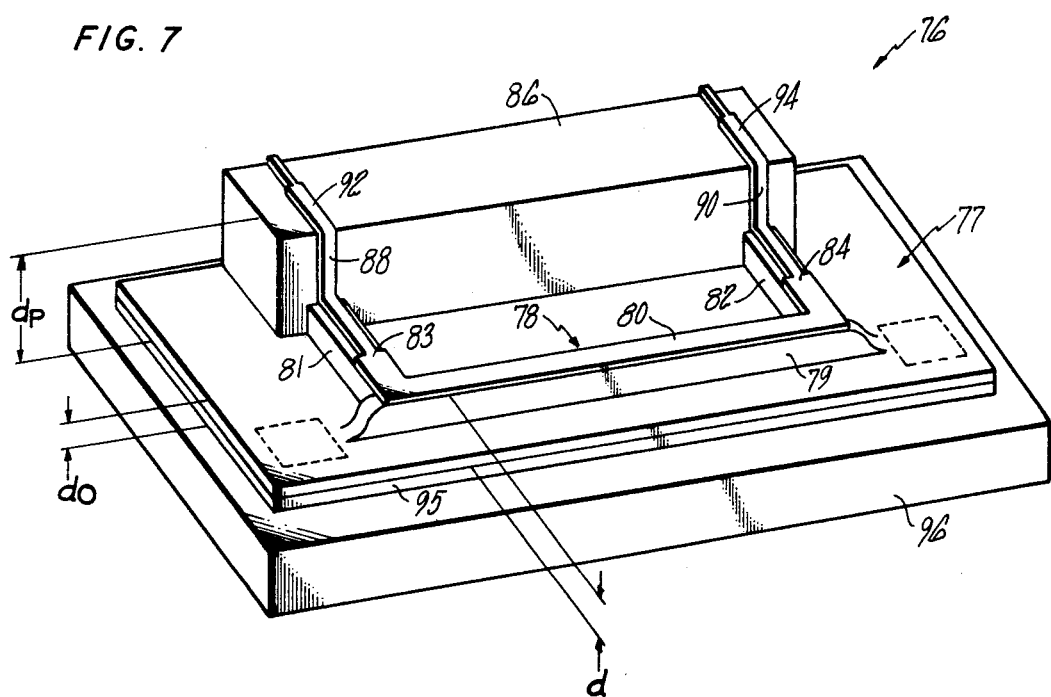
FIG. 7 is a perspective illustration of a traveling wave, broadband microwave waveguide modulator according to the present invention.

An exemplary embodiment of a traveling wave broadband modulator is shown in FIG. 7, wherein the modulator structure 76 comprises a waveguide structure 77 of an electrooptic material identical to that described hereinbefore, having a thin-film waveguide portion 78 with a raised ridge interaction region 79, similar to the raised ridge waveguide 72 of FIG. 6. The raised ridge waveguide has piece-wise linear tapers on either end which provide a linear transition in waveguide thickness from the minimum dimension ($d_o$) in the optical coupling region, to the maximum dimension d along the flat portion of the waveguide. A metallic, microstrip electrode 80, such as copper, is electroplated along the length (L) of the flat portion of the guide. Quarter wavelength coupling ridges 81, 82 are connected on one end perpendicular to the ridge 79 at each end of the length L of the electrode 80, each respectively including matching transformers 83, 84 identical to the transformers 36 of FIGS. 1, 5, 6, and each connected at the other end to a pedestal portion 86 of the structure 77. The thickness ($d_p$) of the pedestal from the bottom surface of the waveguide structure 77 is proportional to the maximum dimension (d) of the raised ridge and is selected in dependence on design considerations for the electrodes of the matching transformers 83, 84. The transformer impedance matching characteristic and turns ratio is dependent on the relative widths of the transformer electrode portions, as described by L. Young, in *Tables for Cascaded Homogeneous Quarter-Wave Transformers*, E. R. E. Trans., MIT-7, Pg. 233, 1959. The use of the pedestal allows larger, absolute width values to be used for the transformer electrodes, such that they can be made with practical fabrication dimensions while still maintaining the desired, relative width ratio. As such the pedestal thickness is variable, and in FIG. 7 is approximately four times greater than the thickness (d) of the raised ridge waveguide 79. For a ridge thickness of 25 microns, the pedestal thickness is on the order of 100 microns.

The input and output impedance transformer sections 83, 84 are connected through electrode sections 88, 90, each much less than one-quarter wavelength, to a second set of matching transformers 92, 94 disposed on the upper surface of the pedestal. A ground electrode 95 is electroplated on the bottom surface of the structure, and the structure and ground electrode are bonded to a copper block 96. Known optical coupling techniques, such as the prism couplers described hereinbefore, provide laser beam coupling in and out of the waveguide.

Figure 8:
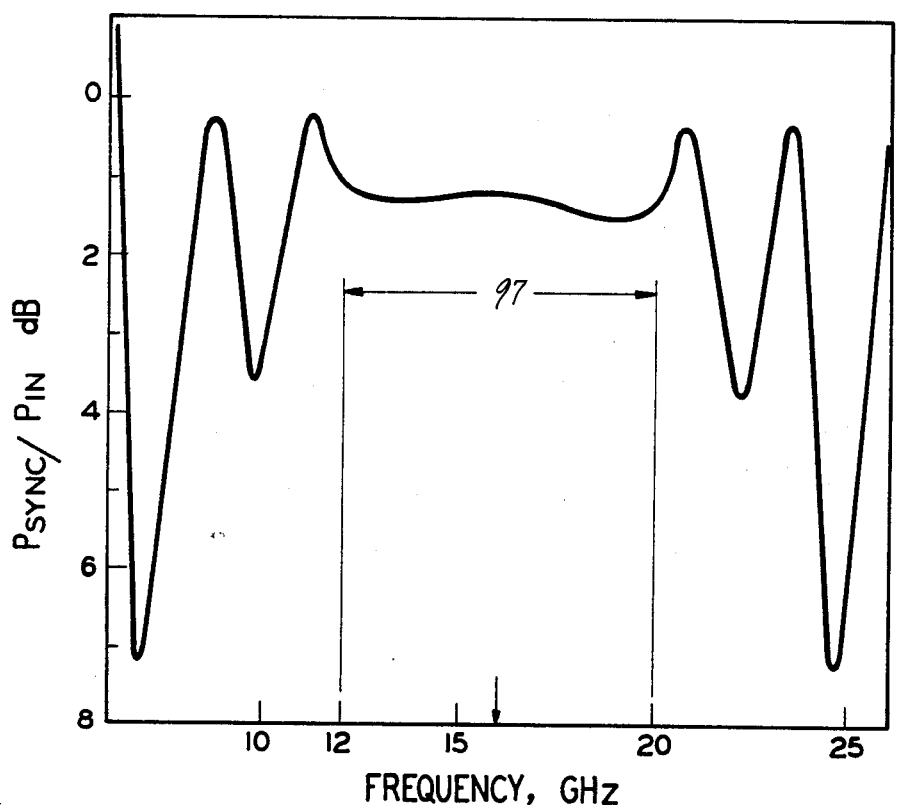
FIG. 8 is an illustration of the theoretical modulation bandwidth provided by the waveguide modulator embodiment of FIG. 7.

The modulator 76 provides microwave modulation in the X and Ku bands, with a modulation bandwidth in excess of 5 GHz for any one of the $CO_2$ laser lines in the nine to eleven micron wavelength region. The microwave impedance transformations at each end of the interaction region, provided by the matching transformers, have identical impedance matching characteristics selected to give maximally flat frequency response over the modulation bandwidth. The wideband impedance transformation from the output impedance of the microwave modulation source to the effective input impedance of the microstrip electrode involve several dimensional changes in the quarter wavelength electrodes, as shown in FIG. 7, with the width dimension of the electrodes varying from a narrowest width at the interface of the modulator with the microwave source, to a maximum width W equal to that of the microstrip electrode 80. The modulation of the optical wave is provided by the modulation signal component having a wave velocity synchronous with that of the optical wave, and the degree of modulation depends on the distribution of synchronous wave amplitudes along the length L. Since the power generated in the optical sidebands is proportional to power carried by the synchronous component of the modulation signal the modulator performance is proportional to the ratio of the synchronous modulation signal power to the power available at the input terminals of the modulator. The theoretical frequency response of the modulator 76 having an interaction length L equal to 2.78 cm is shown in FIG. 8, which is a plot of modulation frequency versus the ratio of the synchronous microwave power ($P_{sync}$) to the microwave input power ($P_{in}$). The frequency range extends from 6 to 26 GHz, with a useful range 97 of eight GHz in the flat, central portion of the frequency response curve. The rapid variations in the synchronous microwave power shown by the portions of the curve outside the range 97 represent the nonuseful regions of operation. The maximum sideband power generated over the bandwidth is about one-third that provided by the resonant type modulators described hereinbefore, for the same modulation input power.

The broadband microwave waveguide modulators of the present invention provide efficient modulation of optical sidebands with modulation signal frequencies ranging from 50 GHz on down. The modulator optical range is the infrared optical spectrum, extending from the submillimeter, or far infrared, to the visible spectrum, or near infrared. The modulator provides selectable power conversion efficiency and modulation bandwidth characteristics by providing modulation of the optical infrared signals in either a resonant type modulator, or a traveling wave modulator structure. Both the resonant type and traveling wave type modulators include integrated optic structures employing thin-film optical waveguides in combination with microstrip construction. The thin-film waveguides have a uniform dimension thickness in the interaction region, allowing uniform refraction of the laser in the guide. The thickness is selectably determined in dependence on the operating laser wavelength as described in the cross-referenced application. For a 10.6 micron wavelength $CO_2$ laser the optical coupling efficiency through a tapered, raised ridge waveguide modulator with an interaction region length on the order of 3 cm, and a maximum dimension (d) of approximately 25 microns, is greater than 60%. This is comparable to that provided through bulk crystal GaAs waveguides of equal interaction length. The thin-film waveguide modulators of the present invention provide an increased modulation electric field strength on the order of 20 dB over that provided by the bulk crystal devices for the same amount of modulation signal input power. The standing wave modulator structure provides a power conversion efficiency in excess of 2% with a 60 watt microwave input power and a $CO_2$ laser propagating through a 2.8 cm long interaction region. The modulation bandwidth of the standing wave structure is on the order of 8 times that of the resonant structure, while the conversion efficiency is about one-half that of the standing wave modulator.

The modulation efficiency of each of the waveguide modulator embodiments disclosed may be further optimized through known techniques for making small adjustments in the velocity of the microwaves along the interaction region. These adjustments can be to the microstrip electrode, and include slowing the wave velocity by the addition of small extensions projecting from one, or both sides of the microstrip at periodic intervals along the length L, which, as may be known, is a well known design for providing slow wave structures. The wave velocity may be increased by addition of a layer of lower dielectric constant material between the microstrip and the surface of the interaction region of the waveguide. The layer thickness, for small increases in wave velocity, would be a fraction of the thickness of the waveguide material. Similarly, although the invention has been shown and described with respect to preferred embodiments thereof, it should be understood by those skilled in the art that the foregoing and various other changes, omissions and additions in the form and detail thereof may be made therein without departing from the spirit and the scope of the invention.

Having thus described typical embodiments of our invention, that which we claim as new and desire to secure by Letters Patent is:

1. A broadband microwave waveguide modulator for phase modulating infrared laser signals provided by a laser source to a guided laser propagation path in the modulator, in response to microwave modulation signals presented from a microwave signal source, comprising:

a monolithic thin-film optical waveguide structure of electrooptic material having two mutally parallel sides of substantially equal length and width, including a multi-level first side and a planar second side, said first side having major and minor surfaces each parallel to said second side and displaced therefrom by a minimum dimension and by a maximum dimension respectively, said minor surface comprising the upper surface of a raised ridge projecting above said major surface and extending longitudinally along a central portion of said first side, said ridge having both length and width smaller than that of said first side, said ridge and the portion of said structure between said ridge and said second side defining a guided laser propagation path;

optical couplers, one disposed at each end of said raised ridge on said first side, for coupling the infrared radiation from the laser source through said guided laser propagation path in a selected TE propagation mode; and a pair of microwave electrodes, one disposed on said minor surface and co-extensive with said ridge and one disposed on said second side surface co-extensive with that portion bounding said guided laser propagation path, said electrodes providing, in response to modulation signals from the microwave signal source, a microwave modulated electric field in said guided laser propagation path for phase modulating the infrared radiation therein.

2. The modulator of claim 1, wherein the ratio of said ridge width to said ridge length is directly proportional to the ratio of the laser signal wavelength divided by the refractive index of said waveguide electrooptic material.

3. The modulator according to claim 1, wherein the value of said maximum dimension is in the range of two to three times the wavelength of the infrared laser signal.

4. The modulator according to claim 3, wherein the value of said minimum dimension is at least five microns smaller than the value of said maximum dimension.

5. The modulator according to claim 3, wherein said optical couplers are disposed on said minor surface of said first side to provide coupling of the infrared laser signal through said guided laser propagation path in a $TE_1$ propagation mode.

6. The modulator according to claim 3, wherein said minor surface is co-extensive with said raised ridge upper surface and wherein said optical couplers are disposed on said major surface, said raised ridge including a taper at each end, each extending from said raised ridge upper surface to said major surface and each having a width equal to that of said raised ridge, said tapers providing a continuous transition in said waveguide structure electrooptic material between said raised ridge upper surface and said major surface, whereby said optical couplers and said tapers provide coupling of the infrared laser signal into said guided propagation path in a $TE_0$ propagation mode.

* * * * *